United States Patent
Kim et al.

(10) Patent No.: US 10,355,510 B2
(45) Date of Patent: Jul. 16, 2019

(54) BATTERY CHARGING METHOD AND BATTERY PACK USING THE SAME

(71) Applicant: Samsung SDI Co., Ltd., Yongin-si, Gyeonggi-do (KR)

(72) Inventors: Jung Min Kim, Yongin-si (KR); Su Bin Song, Yongin-si (KR); Joo Sick Jung, Yongin-si (KR); Myoung Seok Lee, Yongin-si (KR); Dmitry Golovanov, Yongin-si (KR); Green Baek, Yongin-si (KR); Ji Eun Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 510 days.

(21) Appl. No.: 15/006,883

(22) Filed: Jan. 26, 2016

(65) Prior Publication Data

US 2016/0226270 A1    Aug. 4, 2016

(30) Foreign Application Priority Data

Feb. 3, 2015    (KR) .......................... 10-2015-0016695

(51) Int. Cl.
*H02J 7/00*    (2006.01)

(52) U.S. Cl.
CPC .......... *H02J 7/0086* (2013.01); *H02J 7/0021* (2013.01); *H02J 7/0052* (2013.01); *H02J 7/0077* (2013.01)

(58) Field of Classification Search
None
See application file for complete search history.

(56) References Cited

U.S. PATENT DOCUMENTS

| 2009/0112496 | A1* | 4/2009 | Suzuki | H02J 7/0022 702/63 |
| 2011/0156661 | A1* | 6/2011 | Mehta | H02J 7/0073 320/160 |
| 2012/0025771 | A1* | 2/2012 | Bhardwaj | H02J 7/047 320/128 |
| 2012/0133331 | A1* | 5/2012 | Ling | G01R 31/362 320/132 |
| 2012/0280663 | A1 | 11/2012 | Lim et al. | |

FOREIGN PATENT DOCUMENTS

| KR | 10-2012-0122789 A | 11/2012 |
| KR | 10-2012-0124870 A | 11/2012 |
| KR | 10-2013-0137560 A | 12/2013 |

* cited by examiner

*Primary Examiner* — David V Henze-Gongola
(74) *Attorney, Agent, or Firm* — Knobbe Martens Olson & Bear LLP (57) ABSTRACT

A battery pack is disclosed. In one aspect, the battery pack includes a chargeable battery and a battery management system (BMS) configured to charge the battery in a plurality of charging periods each including a constant current supply period and a constant voltage supply period. The battery pack also includes a resistance estimator configured to estimate the resistance of the battery. The BMS is further configured to change a charging period of the battery from a constant voltage supply period of an ith charging period to a constant current supply period of an (i+1)th charging period based on the resistance of the battery, and wherein i is a natural number.

14 Claims, 5 Drawing Sheets

BATTERY CHARGING METHOD AND BATTERY PACK USING THE SAME

CROSS-REFERENCE TO RELATED APPLICATION

This application claims priority to and the benefit of Korean Patent Application No. 10-2015-0016695, filed on Feb. 3, 2015, in the Korean Intellectual Property Office, the entire contents of which are incorporated herein by reference in their entirety.

BACKGROUND

Field

The described technology generally relates to a battery charging method and a battery pack using the same.

Description of the Related Technology

As portable electronic devices such as a mobile phone, a smartphone, a digital camera, a tablet computer, and a laptop computer are widely used, batteries for operating the portable electronic devices are being actively developed. A rechargeable (secondary) battery is provided in the form of a battery pack with a protection circuit for controlling charge and discharge. Various methods for efficiently and stably charging or discharging a battery are suggested.

SUMMARY OF CERTAIN INVENTIVE ASPECTS

One inventive aspect relates to a battery charging method capable of stably charging a battery and a battery pack using the same.

Another aspect is a battery pack that includes a chargeable battery, a battery management system (BMS) configured to charge the battery in a plurality of charging periods respectively including constant current supply periods and constant voltage supply periods, and a resistance determining unit configured to estimate resistance of the battery. The BMS changes a charging period from a constant voltage supply period of an ith charging period to a constant current supply period of an (i+1)th charging period to correspond to the resistance of the battery wherein i is a natural number.

The resistance determining unit estimates the resistance of the battery at least two times in the constant voltage supply period.

The BMS compares a current resistance value with a previous resistance value and changes the charging period when a resistance change ratio is set in a predetermined range.

The predetermined range is set to be no more than 10%.

The battery pack further includes a current measuring unit configured to measure a charging current of the battery and a voltage measuring unit configured to measure a charging voltage of the battery.

The resistance determining unit calculates the resistance of the battery by using the charging current and the charging voltage.

Another aspect is a method of charging a battery that includes in a plurality of charging periods respectively including constant current supply periods and constant voltage supply periods includes estimating the resistance of the battery and changing the charging period from a constant voltage supply period of an ith charging period to a constant current supply period of an (i+1)th charging period to correspond to the resistance of the battery wherein i is a natural number.

The resistance of the battery is estimated at least two times in the constant voltage supply period and the charging period changes when a resistance change ratio of a current resistance value and an immediate previous resistance value is set in a predetermined range.

The predetermined range is set to be no more than 10%.

The resistance of the battery is estimated by using a charging current supplied to the battery and a charging voltage of the battery.

Different currents are supplied in the respective constant current supply periods of the plurality of charging periods and different voltages are supplied in the respective constant voltage supply periods of the plurality of charging periods.

Another aspect is a battery pack comprising: a chargeable battery; a battery management system (BMS) configured to charge the battery in a plurality of charging periods each including a constant current supply period and a constant voltage supply period; and a resistance estimator configured to estimate the resistance of the battery, wherein the BMS is further configured to change a charging period of the battery from a constant voltage supply period of an ith charging period to a constant current supply period of an (i+1)th charging period based on the resistance of the battery, and wherein i is a natural number.

In the above battery pack, the resistance estimator is configured to estimate the resistance of the battery a plurality of times in the constant voltage supply period. In the above battery pack, the BMS is configured to compare a current resistance value with a previous resistance value and change the charging period when a resistance change ratio is set in a predetermined range. In the above battery pack, the predetermined range is set to be no more than about 10%. The above battery pack further comprises a current measuring unit configured to measure a charging current of the battery and a voltage measuring unit configured to measure a charging voltage of the battery. In the above battery pack, the resistance estimator is configured to calculate the resistance of the battery based on the charging current and the charging voltage.

In the above battery pack, the current measuring unit is connected between the BMS and a fuse. In the above battery pack, the voltage measuring unit is connected between the battery and the BMS. In the above battery pack, the BMS is configured to apply a first constant current during the ith charging period and apply a second constant current during the (i+1)th charging period, and wherein the first constant current is greater than the second constant current. In the above battery pack, the BMS is configured to apply a first constant voltage during the ith charging period and apply a second constant voltage during the (i+1)th charging period, and wherein the first constant voltage is greater than the second constant voltage.

Another aspect is a method of charging a battery in a plurality of charging periods each including a constant current supply period and a constant voltage supply period, the method comprising: estimating the resistance of the battery; and changing a charging period of the battery from a constant voltage supply period of an ith charging period to a constant current supply period of an (i+1)th charging period based on the resistance of the battery, wherein i is a natural number.

In the above method, the resistance of the battery is estimated a plurality of times in the constant voltage supply period, and wherein the charging period changes when a resistance change ratio of a current resistance value and an immediate previous resistance value is set in a predetermined range.

In the above method, the predetermined range is set to be no more than about 10%. In the above method, the resistance of the battery is estimated based on a charging current supplied to the battery and a charging voltage of the battery. In the above method, different currents are supplied in the respective constant current supply periods of the charging periods, and wherein different voltages are supplied in the respective constant voltage supply periods of the charging periods.

Another aspect is a battery pack comprising: a chargeable battery; and a battery management system (BMS) configured to charge the battery in a plurality of charging periods each including a constant current supply period and a constant voltage supply period, wherein the BMS is further configured to change a charging period of the battery from a constant voltage supply period of an ith charging period to a constant current supply period of an (i+1)th charging period based on a charging state of the battery, wherein i is a natural number.

The above battery pack further comprises a resistance estimator configured to estimate the resistance of the battery, wherein the BMS is further configured to determine the charging state of the battery based on the estimated resistance of the battery. The above battery pack further comprises a current measuring unit configured to measure a charging current of the battery and a voltage measuring unit configured to measure a charging voltage of the battery, wherein the resistance estimator is configured to calculate the resistance of the battery based on the charging current and the charging voltage.

In the above battery pack, the BMS is configured to apply a first constant current during the ith charging period and apply a second constant current during the (i+1)th charging period, and wherein the first constant current is greater than the second constant current. In the above battery pack, the BMS is configured to apply a first constant voltage during the ith charging period and apply a second constant voltage during the (i+1)th charging period, and wherein the first constant voltage is greater than the second constant voltage.

According to at least one of the disclosed embodiments, a battery is charged by using a plurality of charging periods including constant current supply periods and constant voltage supply periods. Then, resistance of the battery is measured and the charging periods are changed from a current period to a next period in response to the measured resistance. Thus, a charge process of the battery is changed when the resistance of the battery is stabilized so that the battery may be stably charged.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Example embodiments will be described more fully hereinafter with reference to the accompanying drawings. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Figure 1:
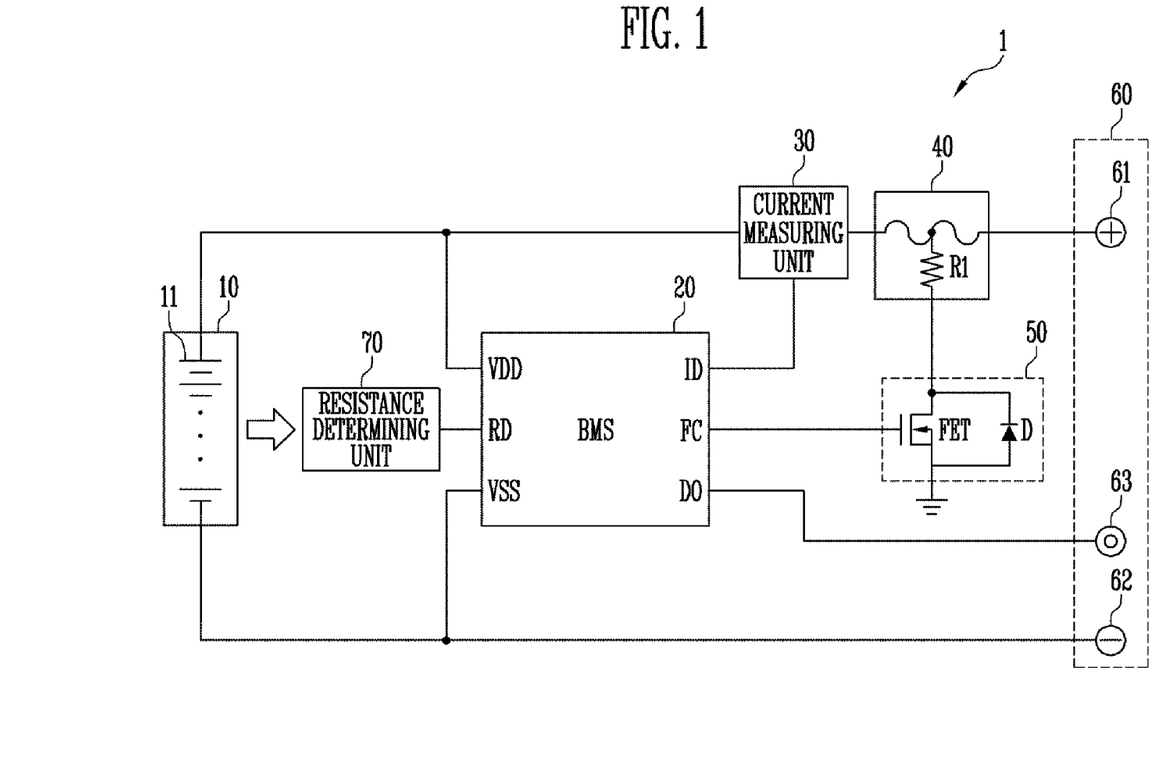
FIG. 1 is a view illustrating a battery pack according to an embodiment.

FIG. 1 is a view illustrating a battery pack 1 according to an embodiment. Depending on embodiments, certain elements may be removed from or additional elements may be added to the battery pack 1 illustrated in FIG. 1. Furthermore, two or more elements may be combined into a single element, or a single element may be realized as multiple elements. This applies to the remaining battery packs 2 and 3 shown in FIGS. 2 and 3.

Referring to FIG. 1, the battery pack 1 includes a battery 10, a battery management system (hereinafter, referred to as BMS) 20, a current measuring unit 30, a fuse 40, a fuse control switch 50, a terminal unit 60, and a resistance determining unit (or resistance estimator) 70.

The battery 10 supplies power stored in an electronic device in which the battery pack 1 is mounted. In addition, when a charger is connected to the battery pack 1, the battery 10 is charged by external current. The battery 10 includes at least one cell 11. The battery cell 11 may be a chargeable secondary battery, for example, a nickel-cadmium battery, a lead storage battery, a nickel metal hydride (NiMH) battery, a lithium-ion battery, or a lithium polymer battery.

The BMS 20 controls charge and discharge of the battery 10 and controls balancing of the battery cell 11 included in the battery 10. In addition, the BMS 20 determines a state of charge (SOC) of the battery 10 in response to the current from the current measuring unit 30. The BMS 20 controls charge of the battery 10 in response to the resistance of the battery 10, which is estimated by the resistance determining unit 70. The BMS 20 may include a power source terminal VDD to which a power source voltage is applied, a ground terminal VSS to which a ground voltage is applied, a fuse control terminal FC, a data output terminal DO, a current measuring terminal ID, and a resistance terminal RD.

The BMS 20 generates a fuse blocking signal applied to the fuse control switch 50 in order to block the fuse 40. The generated fuse blocking signal is output through the fuse control terminal FC. In addition, the BMS 20 may transmit various data items including the SOC of the battery 10 to an external apparatus, for example, the electronic device in which the battery pack 1 is mounted or the charger via the data output terminal DO.

The BMS 20 receives a charging current value measured by the current measuring unit 30 via the current measuring terminal ID. The BMS 20 receives the resistance value of the battery 10, which is estimated by the resistance determining unit 70, via the resistance terminal RD. The BMS 20 that received the current value and the resistance value controls the charge of the battery 10 in response to the current value and the resistance value.

In some embodiments, the battery 10 is charged in a plurality of charging periods and the respective charging periods include constant current supply periods and constant voltage supply periods. The BMS 20 that received the charging current value controls the constant current supply periods in response to the SOC of the battery 10. The BMS 20 that received the resistance value of the battery 10 controls the constant voltage supply periods in response to the resistance value of the battery 10. For example, the BMS 20 controls a point of time at the passage from a constant voltage supply period of a current charging period to a constant current supply period of a next charging period in response to the resistance value of the battery 10, which will be described in detail.

On the other hand, in FIG. 1, the BMS 20 is illustrated as controlling the respective elements of the battery pack 1. However, the present invention is not limited thereto. For example, an analog front end (not shown) for controlling the respective elements while monitoring a state of the battery 10 may be further provided and may be controlled by the BMS 20.

The current measuring unit 30 is positioned on a current path and measures the charging current flowing into the battery 10. The current value measured by the current measuring unit 30 is supplied to the BMS 20. The BMS 20 that received the measuring current value determines the SOC of the battery 10 in response to the charging current and controls the charging period of the battery 10 in response to the determined SOC. On the other hand, in FIG. 1, the current measuring unit 30 is illustrated as being formed between the battery 10 and the fuse 40. However, the present invention is not limited thereto. That is, the current measuring unit 30 may be formed in any position in which the charging current flowing into the battery 10 may be measured. For example, the current measuring unit 30 may be positioned in the BMS 20 to measure the charging current.

The fuse 40 is formed between the battery 10 and the terminal unit 60 and is blocked when the battery pack 1 malfunctions so that discharging current and the charging current may not flow. A resistor R1 included in the fuse 40 is connected between the current path and a ground. When a current of no less than a uniform magnitude flows through the resistor R1, heat is generated by the resistor R1 so that the fuse 40 is blocked.

The fuse control switch 50 allows the current to flow through the resistor R1 included in the fuse 40 so that the fuse 40 is blocked. The fuse control switch 50 is formed between the fuse 40 and the ground and receives the fuse blocking signal from the BMS 20 to be in an on state. When the fuse control switch 50 is set to be in the on state, the current flows through the resistor R1 so that the fuse 40 is blocked. The fuse control switch 50 may include a field effect transistor (FET) and a parasitic diode (D).

The terminal unit 60 connects the battery pack 1 and the external apparatus. Here, the external apparatus may be the electronic device or the charger. The terminal unit 60 includes a positive electrode terminal 61 and a negative electrode terminal 62. The charging current is provided to the positive electrode terminal 61 and the discharging current is discharged from the positive electrode terminal 61. To the contrary, the charging current is discharged from the negative electrode terminal 62 and the discharging current is provided to the negative electrode terminal 62. In addition, the terminal unit 60 includes an output terminal 63 connected to the data output terminal DO of the BMS 20 to output data corresponding to an amount of charge of the battery 10, various data items, or a control signal.

The resistance determining unit 70 estimates the resistance of the battery 10. For example, the resistance determining unit 70 estimates the resistance of the battery 10 at least two times in the constant voltage supply period of the charging period of the battery 10. The resistance of the battery 10 estimated by the resistance determining unit 70 is supplied to the BMS 20 via the resistance terminal RD. The BMS 20 that received the resistance value compares a current resistance value with a previous resistance value and changes the charging period of the battery 10 from the constant voltage supply period to the constant current supply period when the resistance value changes in a predetermined range.

In some embodiments, the charging period of the battery 10 is controlled by using the resistance value of the battery 10. For example, when the battery 10 is charged in the charging periods including the constant current supply periods and the constant voltage supply periods, the amount of current supplied to the battery 10 changes whenever a change from the constant current supply period to the constant voltage supply period or a change from the constant voltage supply period to the constant current supply period occurs.

Furthermore, when the change from the constant voltage supply period to the constant current supply period occurs, the amount of current supplied to the battery 10 can instantaneously and rapidly change. Therefore, in order to stably change the charging period from the constant voltage supply period to the constant current supply period, a change in resistance of the battery 10 is to be minimized. For example, when the charging period changes at a point of time at which the resistance of the battery 10 rapidly changes, it takes long to stabilize the battery 10 or an undesired reaction may occur. In some embodiments, the charging period of the battery 10 changes from the constant voltage supply period to the constant current supply period when the resistance of the battery 10 is estimated a plurality of times in the constant voltage supply period and a currently estimated resistance value changes in a predetermined range from an immediately previously estimated resistance value.

In some embodiments, a supply process of the battery 10 changes at a point of time at which the resistance of the battery 10 is stabilized so that the battery 10 may be stably charged. Additionally, the predetermined range is determined through various experiments. For example, the predetermined range may be set to be no more than about 10%. Experimentally, when a resistance change ratio of the current resistance value of the battery 10 is larger than about 10% in comparison with the previous resistance value, the resistance value of the battery 10 rapidly increases in response to a change in supply period so that the battery 10 is not correctly charged. In addition, the resistance value of the battery 10 rapidly changes so that a lifespan of the cell 11 is reduced.

On the other hand, in FIG. 1, only a part of the battery pack 1 is illustrated and elements in various forms may be added. For example, various elements including a charge control switch (not shown) for controlling the charging current and a discharge control switch (not shown) for controlling the discharging current may be added.

In addition, in FIG. 1, the resistance determining unit 70 is illustrated as an additional element. However, the present invention is not limited thereto. For example, the resistance determining unit 70 may be positioned in the BMS 20.

Figure 2:
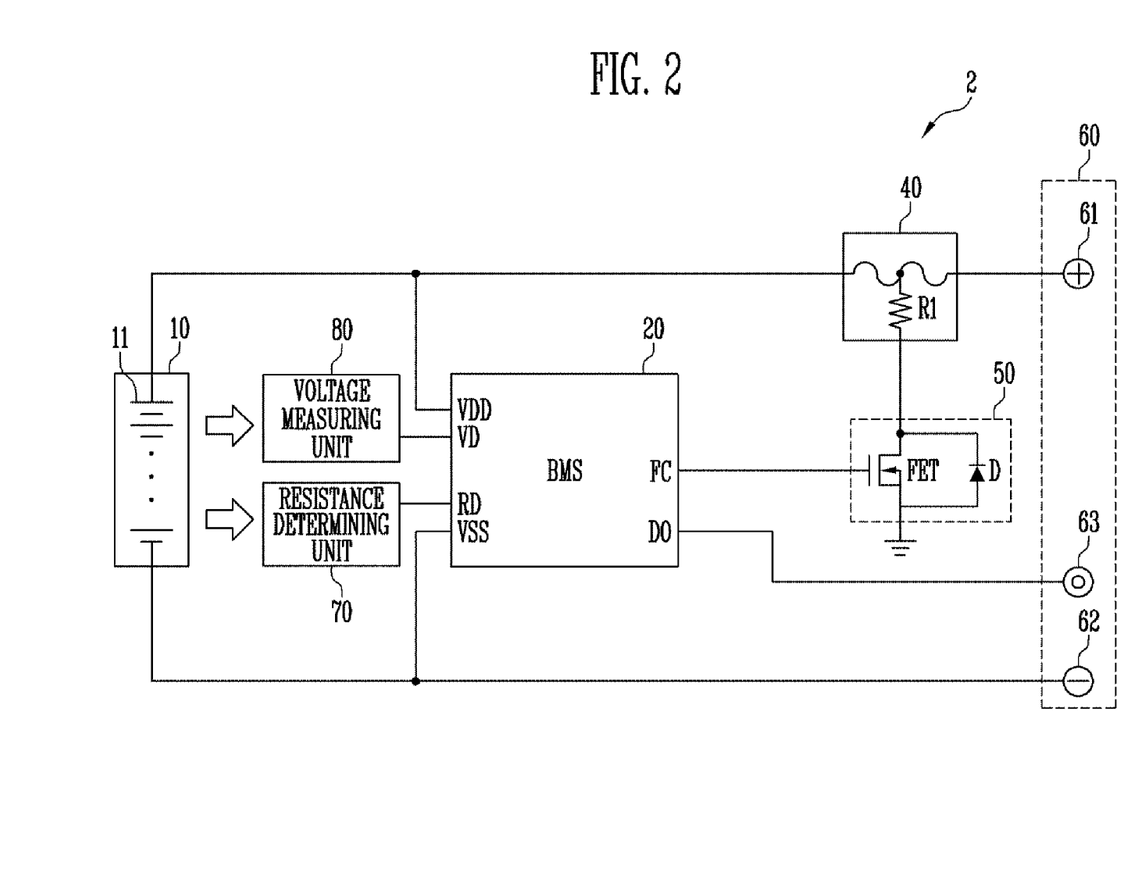
FIG. 2 is a view illustrating a battery pack according to another embodiment.

FIG. 2 is a view illustrating a battery pack 2 according to another embodiment. The same elements as those of FIG. 1 are denoted by the same reference numerals and detailed description thereof will not be given.

Referring to FIG. 2, the battery pack 2 according to another embodiment includes a battery 10, a BMS 20, a fuse 40, a fuse control switch 50, a terminal unit 60, a resistance determining unit 70, and a voltage measuring unit 80.

The voltage measuring unit 80 measures a voltage of the battery 10 and supplies the measured voltage to the BMS 20. The BMS 20 receives the voltage measured by the voltage measuring unit 80 through a voltage measuring terminal VD and determines an amount of charge of the battery 10 by using the received voltage. Additionally, in FIG. 2, the voltage measuring unit 80 is separated from the BMS 20. However, the voltage measuring unit 80 may be included in the BMS 20.

Figure 3:
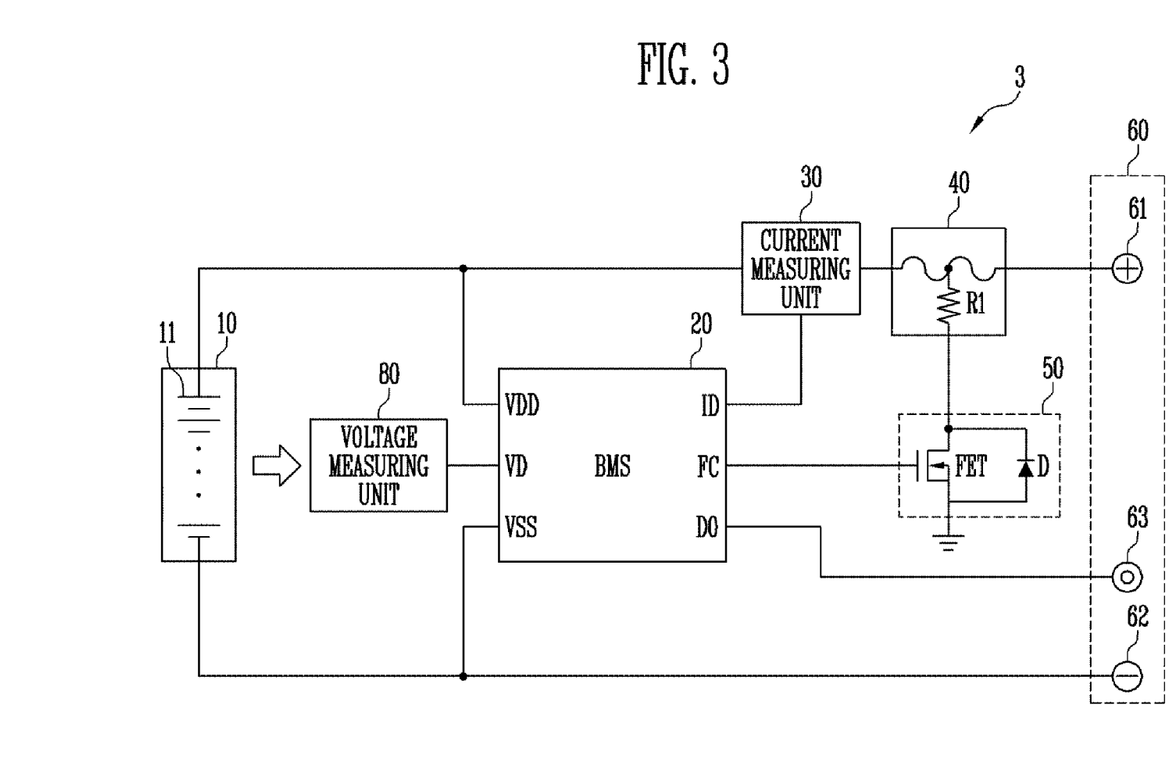
FIG. 3 is a view illustrating a battery pack according to still another embodiment.

FIG. 3 is a view illustrating a battery pack according to still another embodiment. The same elements as those of FIG. 1 are denoted by the same reference numerals and detailed description thereof will not be given.

Referring to FIG. 3, the battery pack 3 includes a battery 10, a BMS 20, a current measuring unit 30, a fuse 40, a fuse control switch 50, a terminal unit 60, and a voltage measuring unit 80.

The voltage measuring unit 80 measures a voltage of the battery 10 and supplies the measured voltage to the BMS 20. The current measuring unit 30 measures a charging current flowing into the battery 10 and supplies the charging current to the BMS 20.

The BMS 20 receives the voltage measured by the voltage measuring unit 80 through the voltage measuring terminal VD and receives the current measured by the current measuring unit 30 through a current measuring terminal ID. The BMS 20 that received the voltage and the charging current of the battery 10 determines the amount of charge of the battery 10 based on the voltage and the current. Additionally, a resistance determining unit (not shown) for calculating resistance of the battery 10 based on the voltage and the charging current of the battery 10 is provided in the BMS 20. The BMS 20 controls a charging period of the battery 10 based on the resistance of the battery 10 calculated by the resistance determining unit.

On the other hand, in FIG. 3, the current measuring unit 30 and the voltage measuring unit 80 are separated from the BMS 20. However, the present invention is not limited thereto. For example, the voltage measuring unit 80 and/or the current measuring unit 30 may be included in the BMS 20. In addition, the resistance determining unit included in the battery 10 may be additionally provided in the outside of the BMS 20.

Figure 4:
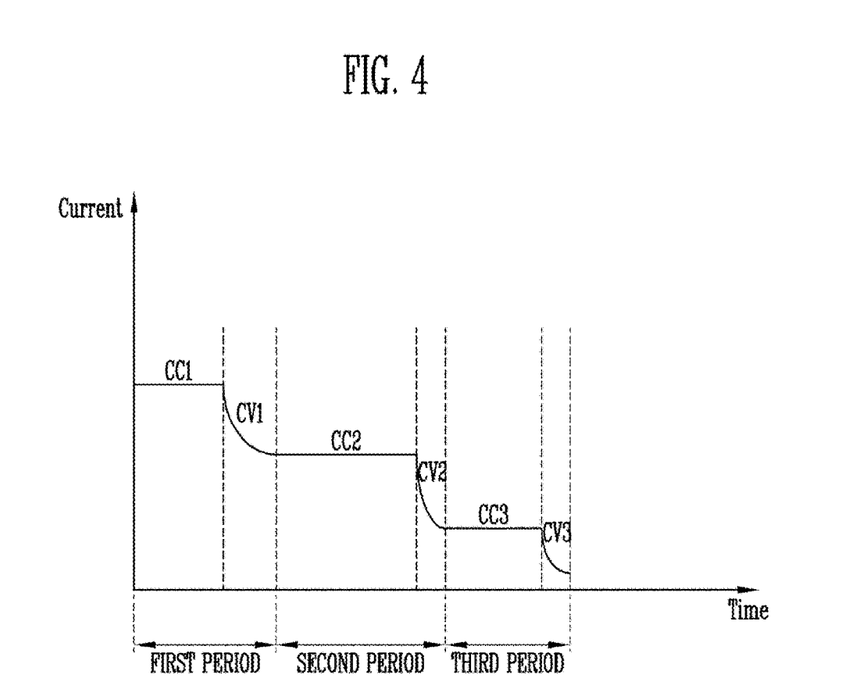
FIG. 4 is a graph illustrating a battery pack charging method according to an embodiment.

FIG. 4 is a graph illustrating a battery pack 10 charging method according to an embodiment.

Referring to FIG. 4, the battery 10 is charged in a plurality of charging periods, for example, a first period, a second period, and a third period. The battery 10 is charged based on different constant currents and constant voltages in the first period, the second period, and the third period.

That is, each of the first period, the second period, and the third period includes a constant current supply period CC and a constant voltage supply period CV. The first period includes a first constant current supply period CC1 and a first constant voltage supply period CV1. The second period includes a second constant current supply period CC2 and a second constant voltage supply period CV2. The third period includes a third constant current supply period CC3 and a third constant voltage supply period CV3.

In the constant current supply period CC, the battery 10 is charged while supplying a constant current. When the constant current is supplied to the battery 10, the battery 10 is charged within a short time. Here, the constant currents supplied in the first constant current supply period CC1, the second constant current supply period CC2, and the third constant current supply period CC3 have different values. For example, as a state of charge (SOC) of the battery 10 increases, a magnitude of the constant current may be reduced.

That is, the constant current supplied in the first constant current supply period CC1 is larger than the constant current supplied in the second constant current supply period CC2. The constant current supplied in the second constant current supply period CC2 is larger than the constant current supplied in the third constant current supply period CC3. That is, according to the embodiment, a current value supplied in the constant current supply period CC is reduced from the first period toward the third period so that it is possible to prevent the battery 10 from deteriorating due to overcurrent.

In the constant voltage supply period CV, the battery 10 is charged while supplying a constant voltage. Specifically, when the battery 10 is charged based on only the constant current, heat is generated by the current so that a probability of deteriorating the battery 10 increases. In order to prevent the battery 10 from deteriorating, according to the present embodiment, each period includes the constant voltage supply period CV. When the constant voltage is supplied to the battery 10, heat generated by the battery 10 is minimized so that it is possible to prevent the battery 10 from deteriorating.

On the other hand, the constant voltages supplied in the first constant voltage supply period CV1, the second constant voltage supply period CV2, and the third constant voltage supply period CV3 have different values. For example, as the state of charge (SOC) of the battery 10 increases, the constant voltage may be reduced. That is, the constant voltage supplied in the first constant voltage supply period CV1 is higher than the constant voltage supplied in the second constant voltage supply period CV2. The constant voltage supplied in the second constant voltage supply period CV2 is higher than the constant voltage supplied in the third constant voltage supply period CV3. In some embodiments, a voltage value supplied in the constant voltage supply period CV may be reduced from the first period toward the third period.

On the other hand, the constant current supply periods respectively included in the first to third periods are previously set as predetermined periods or are determined in response to the SOC of the battery 10. For example, the BMS 20 measures the SOC of the battery 10 and may change a charging period from the constant current supply period to the constant voltage supply period in response to the measured SOC.

The constant voltage supply periods CV respectively included in the first to third periods are determined in response to the resistance of the battery 10. For example, the BMS 20 determines the resistance of the battery 10 at least two times in a constant voltage supply period CVi of an ith (i is a natural number) period and changes the charge process to a constant current supply period CCi+1 of an (i+1) period when a current resistance value changes from an immediate previous resistance value in a predetermined range (no more than 10%).

Figure 5:
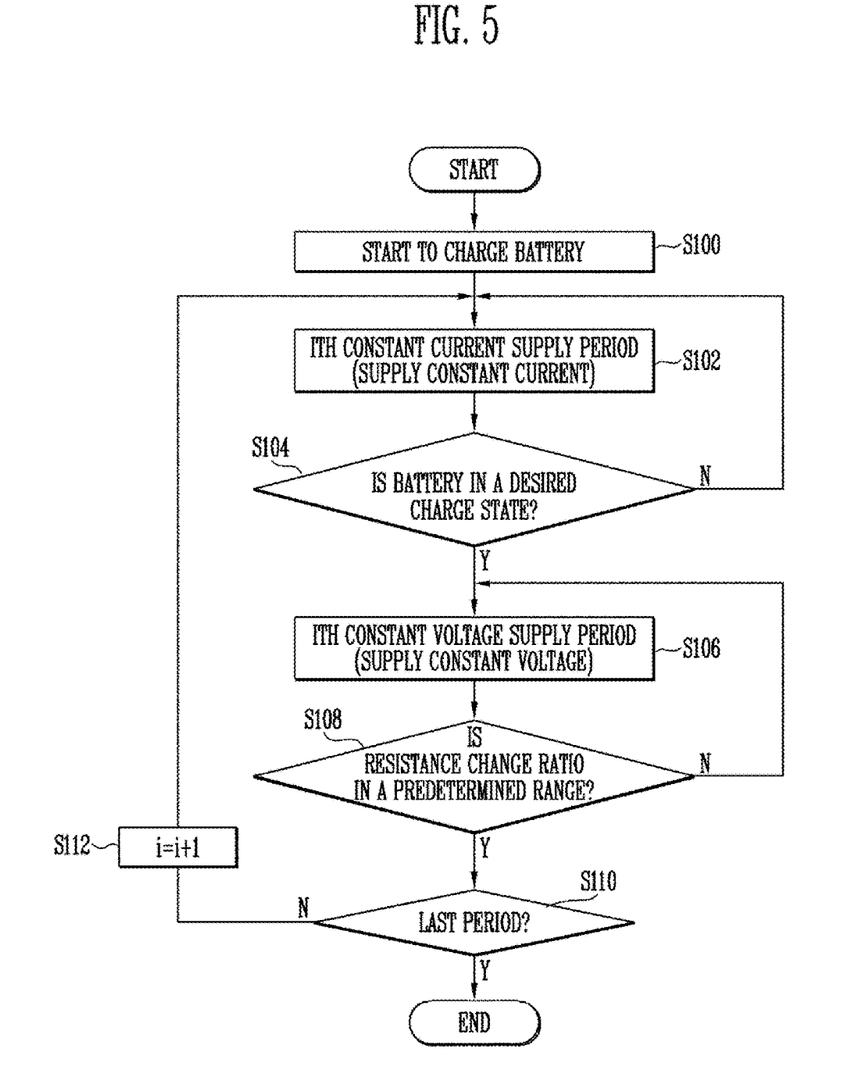
FIG. 5 is a flowchart illustrating a battery charging method according to an embodiment.

FIG. 5 is a flowchart illustrating a battery charging method according to an embodiment. Depending on embodiments, additional states may be added, others removed, or the order of the states changed in the procedure of FIG. 5. This applies to the remaining method embodiments. In some embodiments, the FIG. 5 procedure is implemented in a conventional programming language, such as C or C++ or another suitable programming language. The program can be stored on a computer accessible storage medium of each of the battery packs 1-3. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 5.

Referring to FIG. 5, first, an external charger is connected to the terminal unit 60 and the battery 10 starts to be charged in operation S100. At this time, the BMS 20 performs control so that a constant current is supplied to the battery 10 in response to an ith constant current supply period in operation S102. When the constant current is supplied in the operation S102, the BMS 20 determines the SOC of the battery 10 in operation S104.

When the battery 10 is not charged to a desired voltage in the operation S104, the constant current is supplied to the battery 10 in response to the ith constant current supply period. When the battery 10 is charged to a desired voltage in the operation S104, the BMS 20 performs control so that a constant voltage is supplied to the battery 10 in response to an ith constant voltage supply period in operation S106.

When the constant voltage is supplied in the operation S106, the BMS 20 estimates the resistance of the battery 10 at least two times by using the resistance determining unit 70. For example, the resistance determining unit 70 may estimate the resistance of the battery 10 every predetermined time in response to the control of the BMS 20. The BMS 20 compares a current resistance value with a previous resistance value and performs control so that the constant voltage is supplied to the battery 10 in response to the ith constant voltage supply period when the resistance change ratio is larger than a predetermined range in operations S106 and S108. When the resistance change ratio of the current resistance value and the previous resistance value is set in a predetermined range, the BMS 20 determines whether a current charging period is a last period in operations S108 and S110.

When it is determined that the current charging period is the last period in the operation S110, charge of the battery 10 is completed. When it is determined that the current charging period is not the last period in the operation S110, the charge process proceeds to a next charging period in operation S112. In some embodiments, the battery 10 is charged while repeating the above-described method.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack comprising:
a chargeable battery;
a battery management system (BMS) configured to charge the battery in a plurality of charging periods of one charge cycle, each charging period including a constant current supply period and a constant voltage supply period, wherein the constant current supply periods and the constant voltage supply periods are alternately provided throughout the plurality of charging periods; and
a resistance estimator configured to estimate the resistance of the battery a plurality of times in each of the constant voltage supply periods,
wherein the BMS is further configured to change a charging period of the battery from a constant voltage supply period of an ith charging period to a constant current supply period of an (i+1)th charging period based on a first factor and change the constant current supply period of the (i+1)th charging period to a constant voltage supply period of an (i+2)th charging period based on a second factor different from the first factor, wherein i is a natural number, and wherein the first factor comprises the resistance of the battery, and wherein the second factor comprises the state of charge (SOC) of the battery.

2. The battery pack of claim 1, wherein the BMS is configured to compare a current resistance value with an immediate previous resistance value in each of the charging periods and change the charging period when a resistance change ratio is set in a predetermined range, and wherein the resistance change ratio is defined as a ratio of the current resistant value and the immediate previous resistance value in each of the charging periods.

3. The battery pack of claim 2, wherein the predetermined range is set to be no more than about 10%.

4. The battery pack of claim 1, further comprising a current measuring circuit configured to measure a charging current of the battery and a voltage measuring circuit configured to measure a charging voltage of the battery.

5. The battery pack of claim 4, wherein the resistance estimator is configured to calculate the resistance of the battery based on the charging current and the charging voltage.

6. The battery pack of claim 4, wherein the current measuring circuit is connected between the BMS and a fuse.

7. The battery pack of claim 4, wherein the voltage measuring circuit is connected between the battery and the BMS.

8. The battery pack of claim 1, wherein the BMS is configured to apply a first constant current during the ith charging period and apply a second constant current during the (i+1)th charging period, and wherein the first constant current is greater than the second constant current.

9. The battery pack of claim 1, wherein the BMS is configured to apply a first constant voltage during the ith charging period and apply a second constant voltage during the (i+1)th charging period, and wherein the first constant voltage is greater than the second constant voltage.

10. A method of charging a battery in a plurality of charging periods of one charge cycle each charging period including a constant current supply period and a constant voltage supply period, the method comprising:
   estimating the resistance of the battery a plurality of times in each of the constant voltage supply period;
   changing a charging period of the battery from a constant voltage supply period of an ith charging period to a constant current supply period of an (i+1)th charging period based on a first factor and changing the constant current supply period of the (i+1)th charging period to a constant voltage supply period of an (+2)th charging period based on a second factor different from the first factor, wherein i is a natural number, wherein the constant current supply periods and the constant voltage supply periods are alternately provided throughout the plurality of charging periods, and wherein the first factor comprises the resistance of the battery, and wherein the second factor comprises the state of charge (SOC) of the battery.

11. The method of claim 10, wherein the charging period changes when a resistance change ratio of a current resistance value and an immediate previous resistance value in each of the charging periods is set in a predetermined range.

12. The method of claim 11, wherein the predetermined range is set to be no more than about 10%.

13. The method of claim 11, wherein the resistance of the battery is estimated based on a charging current supplied to the battery and a charging voltage of the battery.

14. The method of claim 11, wherein different currents are supplied in the respective constant current supply periods of the charging periods, and wherein different voltages are supplied in the respective constant voltage supply periods of the charging periods.

* * * * *